Oct. 28, 1941.  J. P. THOMPSON  2,260,923
FISH TRAP-HOOK
Filed Dec. 26, 1939

INVENTOR
JAMES P. THOMPSON
BY
ATTORNEY

Patented Oct. 28, 1941

2,260,923

UNITED STATES PATENT OFFICE 2,260,923

FISH TRAP-HOOK

James P. Thompson, Louisville, Ky.

Application December 26, 1939, Serial No. 310,947

7 Claims. (Cl. 43—34)

My invention relates to automatically actuated fish hooks.

Briefly, my invention distinguishes from the prior art by an extremely simple and strong construction utilizing a new principle of automatically releasing a baited hook for quick movement into a fish in response to the action of a strained spring, and independently of the force applied to the hook by the fish. Thus, the new principle involves releasing the baited, spring-biased hook, when the fish's lip engages a trigger bar, whereupon the barb of the hook is forced into the fish's tissue before the fish has sensed danger through being pricked by the point of the hook. Tersely stated, the barbed hook is forced into the fish rather than the fish forcing himself onto the hook.

Primarily, the object of my invention is to provide a fish hook apparatus that will automatically actuate the hook so as to embed the barb thereof in the tissue of the mouth of a fish, when the latter begins to take the bait, and thereby increase the catch in terms of other known fish hooks and actuating devices associated therewith.

Another object is to provide a dependable mechanical embodiment of the invention having a minimum number of parts, each of which is of very simple construction so as to provide enduring service and low cost of manufacture.

A still further object of this invention is to construct an automatic fish hook that can be produced in large quantities, readily assembled, and then dis-assembled for the purpose of repair and substituting corresponding new parts for any one of the component parts should one of the same become damaged.

Figure 1:
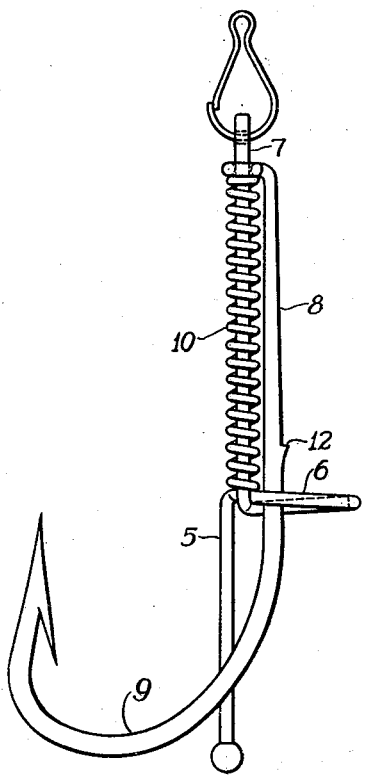

In order to apprise those familiar with the art how to practice my invention, I shall now disclose a successful embodiment thereof when taken in connection with the accompanying drawing, in which Figure 1 is an elevated view of the complete fish trap-hook in the sprung or normal state.

Figure 2:
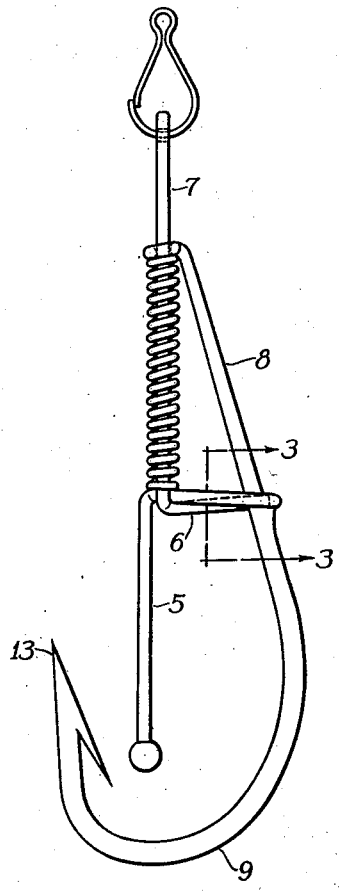

Figure 2 shows the same structure in the "set" position ready for use. However, the conventional fish bait is not indicated in either figure. It should be noted that the generally straight member on which the spring and hook are mounted, hereinafter referred to as "bar" member, is shown in the same position in Figures 1 and 2, which is substantially vertical, while the hook in Figure 2 is shown displaced or in a relatively offset location in relation to the bar.

Figure 3:
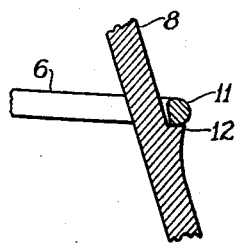

Figure 3 is a central section, on an enlarged scale, through a vertical plane designated by line 3, 3 of Figure 2.

Numerals 5, 6 and 7 indicate the integral bar member, which member is formed from a single piece of wire. Numeral 6 indicates a loop having a width sufficient to freely accommodate shank 8 of the hook 9 in any position.

The upper end of shank 8 is formed with an eye so that it will completely, but loosely, encircle section 7 of the bar, and provide free movement whether the bar is in the position shown in Figure 1 or 2. Compression spring 10 surrounds section 7 of the bar and is organized for free movement with its ends juxtaposed with the above mentioned eye and loop 6, so that its force will bring the hook to rest as shown in Figure 1, when not set for use. This spring is proportioned to provide for the hook being manually forced downwardly and outwardly as shown in Figure 2 in order that the latch lip member 11 of the bar will engage the latch lip member 12 of the shank and be retained in such position. This is the set position when the trap-hook is prepared for use.

As the fish is in the act of taking the bait, its mouth will be opened with the forward edge or "lip" thereof protruding, consequently the lower section 5 of the bar, as shown in Figure 2, will be directly in the path of said edge. Therefore, coincident with the fish grasping the bait, its lip moves bar 5, which movement disengages the latch members, thereby releasing the spring that forces the barb of the hook directly into the tissue of the fish's mouth without giving the fish an opportunity to free itself upon feeling the presence of the point 13 of the hook.

Obviously, whether the fish comes up to take the bait cautiously or avidly, the hook operates independently of any manipulation of same by the fisher through the fish line, and the action of the spring to force the hook into the tissues of the fish is the same. This automatic hooking can take place even before the fisher has sensed the presence of the fish at the hook. When using conventional fishing equipment the fisher must definitely sense the presence of a fish when the fish nibbles the bait, and then give mental effect to same before muscular effort is applied to the hook, all of which provides a definite time lag that is eliminated in my automatic fish trap-hook. Therefore, it will be apparent that the disclosed embodiment of my invention achieves the objects stated at the outset hereof.

Without further elaboration, the foregoing will so fully explain the gist of my invention that others may, by applying current knowledge, readily adopt the same for use under varying conditions of service, without eliminating certain features, which may properly be said to constitute the essential items of novelty involved, which items are intended to be defined and secured to me by the following claims:

I claim:

1. A fish trap-hook, comprising, a bar member having a line secured adjacent one end thereof and a loop formed from the mid-section thereof; a hook having an integral shank equipped with a notch at the mid-section thereof for engagement with said loop for providing a latch; said shank being slidably disposed in said loop and having an end thereof terminating in an eye embracing said bar for providing a bearing therefor; a spring disposed on said bar and having its ends located for engagement with said eye and said loop for actuating said hook longitudinally of said bar upon dis-engagement of said notch from said loop.

2. A fish trap-hook, comprising; a bar member having a line secured adjacent one end thereof and equipped with a latch member; a fish hook having an integral shank equipped with a latch member for engagement with the first mentioned latch member for retaining said hook in the set position; said shank being slidably attached to said bar; and a spring engaging said bar and said shank for retaining said latch members engaged and actuating said hook longitudinally of said bar upon disengagement of said latch members.

3. A fish trap-hook comprising, a wire frame member adapted to be secured to a fish line and having a laterally elongated loop formed therefrom; a hook having the shank thereof slidably disposed in the said loop for longitudinal and lateral movement relative to the said frame; an eye formed adjacent the end of the shank, slidably and pivotally embracing the body of the frame; a compression spring slidably mounted upon the said body of the frame, and reacting between the loop thereof and the eye of the said hook; a notch formed at the mid-section of the shank of the hook, adapted to engage the outer end of the said loop, when the hook is moved longitudinally and laterally outwardly relative to the said frame, for maintaining the said spring in compressed condition; and a trigger secured to the said frame adapted to be engaged by the lip of a fish for moving the frame member laterally inwardly relative to the shank of the hook to release the said spring, and thereby to simulate a quick jerk of the fish line and to drive the hook into the lip of the fish.

4. A fish trap-hook comprising, a frame member adapted to be secured to a fish line, and having a guide member extending laterally therefrom, the said guide member having a laterally elongated aperture formed therein; a hook having the shank thereof slidably disposed in the said aperture, and having the upper end of the said shank slidably and pivotally mounted upon the said frame member for longitudinal and lateral movement relative to the said frame member; a spring operatively associated with the said hook and frame member, and biasing the said hook longitudinally upwardly relative to the said frame member; the said hook having a latch member extending laterally from the shank thereof and adapted to engage the said guide member, when the hook is moved longitudinally downwardly and laterally outwardly relative to the said frame member, for releasably holding the said hook in a latched position against the biasing action of the said spring; and means operatively associated with the said hook and frame member, for moving the hook and the frame member laterally inwardly relative one to the other, to disengage the latch member from the said guide member, when the same are engaged by the lips of a fish, and thereby to permit the said spring to move quickly the hook longitudinally upwardly relative to the said frame and to drive the hook into a lip of the fish, and thus to simulate a quick jerk of the fish line.

5. A fish trap-hook comprising, a frame member adapted to be secured to a fish line; a hook slidably mounted upon the said frame member for longitudinal movement relative thereto; a spring operatively associated with the said hook and frame member, and biasing the said hook longitudinally upwardly relative thereto; latch means, operatively associated with the said frame member and said hook, for releasably holding the said hook in a latched position against the biasing action of the said spring, when the said hook is moved longitudinally downwardly relative to the said frame member; and means, operatively associated with the said latch means, and adapted to be engaged by the lips of a fish, for releasing the said latch, and thereby to permit the said spring to move quickly the hook longitudinally upwardly relative to the said frame member and to drive the hook into a lip of the fish, and thus to simulate a quick jerk of the fish line.

6. A fish trap-hook comprising, a frame member adapted to be secured to a fish line; a hook slidably mounted upon the said frame member for longitudinal movement relative thereto; a spring operatively associated with the frame member and the said hook and biasing the hook longitudinally upwardly relative to the said frame member; and means, operatively associated with the said hook and said frame member, for releasably holding the said hook in a set position against the biasing action of the said spring, when the said hook is moved longitudinally downwardly relative to the said frame member.

7. A fish trap-hook comprising, a wire frame member adapted to be secured to a fish line and having a laterally extending loop formed therefrom; a hook having the shank thereof slidably disposed in the said loop, and having an eye formed adjacent the upper end thereof slidably engaging the said frame member, for longitudinal movement relative to the said frame member; a compression spring slidably mounted upon the said frame member, and reacting between the loop thereof and the eye of the said hook; a latch member extending laterally from the shank of the said hook, and adapted to engage the said loop, when the hook is moved longitudinally downwardly relative to the said frame member, for maintaining the said spring in compressed condition; and means operatively associated with the said hook and frame member, for disengaging the said latch member from the said loop, when the said hook and frame member are engaged by the lips of a fish, thereby to permit the spring to move quickly the said hook longitudinally upwardly relative to the said frame member, and thus to simulate a quick jerk of the fish line.

JAMES P. THOMPSON.